United States Patent
Sato et al.

(10) Patent No.: US 10,647,784 B2
(45) Date of Patent: May 12, 2020

(54) RESIN AND SURFACE PROTECTIVE PLATE OR AUTOMOTIVE MATERIAL

(71) Applicant: SUMITOMO CHEMICAL COMPANY, LIMITED, Tokyo (JP)

(72) Inventors: Yoshinori Sato, Niihama (JP); Kenta Ishizuka, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/746,724

(22) PCT Filed: Jul. 20, 2016

(86) PCT No.: PCT/JP2016/071206
§ 371 (c)(1),
(2) Date: Jan. 22, 2018

(87) PCT Pub. No.: WO2017/014223
PCT Pub. Date: Jan. 26, 2017

(65) Prior Publication Data
US 2018/0215837 A1    Aug. 2, 2018

(30) Foreign Application Priority Data
Jul. 23, 2015   (JP) .................................. 2015-145541

(51) Int. Cl.
| | | |
|---|---|---|
| *C08B 37/00* | (2006.01) | |
| *C08B 37/16* | (2006.01) | |
| *C08F 2/44* | (2006.01) | |
| *C08F 283/06* | (2006.01) | |
| *C08F 290/14* | (2006.01) | |
| *C08J 3/20* | (2006.01) | |
| *C08J 3/24* | (2006.01) | |
| *C08L 3/02* | (2006.01) | |
| *C08L 33/08* | (2006.01) | |
| *C08L 33/10* | (2006.01) | |

(52) U.S. Cl.
CPC ............ *C08B 37/0015* (2013.01); *C08F 2/44* (2013.01); *C08F 283/06* (2013.01); *C08F 290/14* (2013.01); *C08J 3/20* (2013.01); *C08J 3/246* (2013.01); *C08L 3/02* (2013.01); *C08L 33/08* (2013.01); *C08L 33/10* (2013.01); *C08F 2500/02* (2013.01); *C08F 2810/20* (2013.01); *C08F 2810/40* (2013.01); *C08L 2205/04* (2013.01); *C08L 2205/22* (2013.01)

(58) Field of Classification Search
CPC ...... C08B 37/0015; C08L 33/08; C08L 33/10; C08L 3/02; C08L 2205/04; C08L 2205/22; C08J 3/20; C08J 3/246; C08F 2/44; C08F 290/14; C08F 283/06; C08F 2500/02; C08F 2810/20; C08F 2810/40
See application file for complete search history.

(56) References Cited

U.S. PATENT DOCUMENTS

| | | | |
|---|---|---|---|
| 8,686,181 B2 * | 4/2014 | Knebel | ................... C07C 67/03 560/217 |
| 2008/0097039 A1 | 4/2008 | Ito et al. | |
| 2009/0011933 A1 | 1/2009 | Ito et al. | |
| 2009/0214871 A1 * | 8/2009 | Fukuda | ..................... C09D 4/00 428/413 |
| 2009/0215919 A1 | 8/2009 | Ito et al. | |
| 2009/0312490 A1 | 12/2009 | Ito et al. | |
| 2009/0312492 A1 | 12/2009 | Ruslim et al. | |
| 2015/0192710 A1 | 7/2015 | Agata et al. | |
| 2015/0361209 A1 | 12/2015 | Masuhara et al. | |
| 2017/0335044 A1 | 11/2017 | Hayashi | |
| 2018/0072028 A1 * | 3/2018 | Ueki | ..................... B32B 27/308 |

FOREIGN PATENT DOCUMENTS

| | | |
|---|---|---|
| CN | 1910218 A | 2/2007 |
| CN | 1938367 A | 3/2007 |
| CN | 1946766 A | 4/2007 |
| CN | 101627057 A | 1/2010 |
| EP | 2873693 A1 | 5/2015 |

(Continued)

OTHER PUBLICATIONS

International Search Report for corresponding International Application No. PCT/JP2016/071206 dated Oct. 14, 2016.
Official Action for Japanese Patent Application No. 2017-529902 dated Aug. 20, 2019 and its English translation.
Page of website of Showa Denko K.K., "Karenz Moi™"http://www.karenz.jp/ja/moi/index.html accessed Jul. 18, 2019 and corresponding English language page.
Page of website of Showa Denko K.K., "Karenz Aoi™" http://www.karenz.jp/ja/aoi/ind ex.html accessed Jul. 18, 2019 and corresponding English language page, as well as partial English language of "Physical Properties" section.

(Continued)

*Primary Examiner* — Robert S Jones
(74) *Attorney, Agent, or Firm* — Renner, Otto, Boisselle & Sklar, LLP

(57) ABSTRACT

Provided is a resin including both a structural unit derived from a monomer having a carbon-carbon double bond at a terminal thereof and a structural unit derived from a polyrotaxane compound, wherein the polyrotaxane compound is a compound substituted with a (meth)acryloyl group or a group containing a (meth)acryloyl group, the polyrotaxane includes optionally substituted cyclodextrin, a linear molecule clathrated in the optionally substituted cyclodextrin in a skewer shape, and a capping group for preventing the optionally substituted cyclodextrin from leaving, the capping group being located at a terminal of the linear molecule clathrated in the optionally substituted cyclodextrin in a skewer shape, and the weight average molecular weight of the linear molecule clathrated in the optionally substituted cyclodextrin in a skewer shape is greater than or equal to 21000 and less than or equal to 500000.

6 Claims, 1 Drawing Sheet

(56) References Cited

FOREIGN PATENT DOCUMENTS

| | | |
|---|---|---|
| JP | 4482633 | 6/2010 |
| JP | 5176087 | 4/2013 |
| JP | 2014-224270 A | 12/2014 |
| JP | 2015-189972 A | 11/2015 |
| JP | 2016-69398 A | 5/2016 |
| WO | WO 2006/088200 A1 | 8/2006 |
| WO | WO 2014/051058 A1 | 4/2014 |
| WO | WO 2014/112234 A1 | 7/2014 |
| WO | WO 2016/072356 A1 | 5/2016 |

OTHER PUBLICATIONS

Official Action for Chinese Patent Application No. 201680043256.8 dated Aug. 7, 2019 and its partial English translation.
Extended European Search Report for corresponding European Application No. 16827783.8 dated Mar. 19, 2019 (search completed on Mar. 7, 2019).

\* cited by examiner

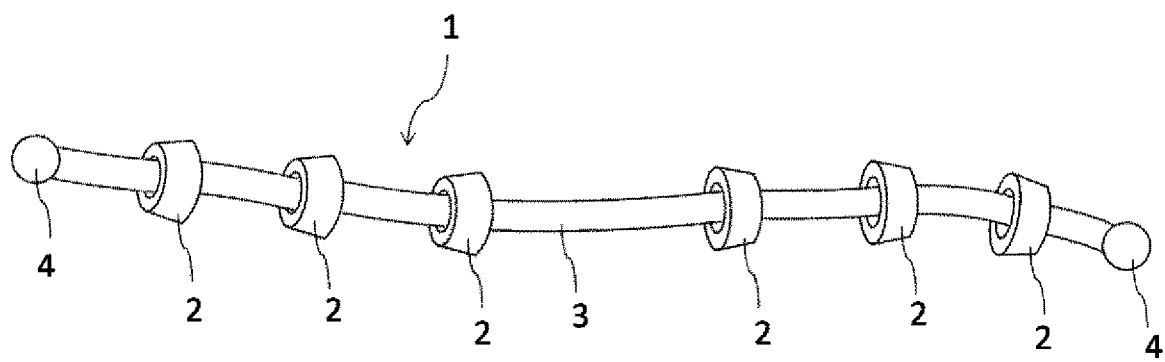

RESIN AND SURFACE PROTECTIVE PLATE OR AUTOMOTIVE MATERIAL

TECHNICAL FIELD

The present invention relates to a resin that has both a structural unit derived from a monomer having a carbon-carbon double bond at a terminal thereof and a structural unit derived from a polyrotaxane compound.

BACKGROUND ART

Polyrotaxane has characteristic functions and properties because of the uniqueness of its molecular structure, and therefore the application of polyrotaxane to various technical fields has been studied in recent years. For example, in PTD 1, an automotive transparent plastic material having a hydrophobic polyrotaxane is reported.

CITATION LIST

Patent Document

PTD 1: Japanese Patent No. 5176087

SUMMARY OF INVENTION

Technical Problems

However, the transparent plastic material disclosed in the above-mentioned Patent Document is not satisfactory with respect to its impact resistance.

The problem to be solved by the present invention is to provide: a resin that is transparent and has excellent impact resistance; and a display window protective plate or an automotive material each including the resin.

Solutions to Problems

The present invention provides a resin including both a structural unit derived from a monomer having a carbon-carbon double bond at a terminal thereof and a structural unit derived from a polyrotaxane compound, wherein the polyrotaxane compound is a compound in which, when the total number of hydrogen atoms in hydroxyl groups contained in polyrotaxane is defined as 100%, greater than or equal to 4% and less than or equal to 10% of the hydrogen atoms in the hydroxyl groups are substituted with a (meth)acryloyl group or a group containing a (meth)acryloyl group, the polyrotaxane includes optionally substituted cyclodextrin, a linear molecule clathrated in the optionally substituted cyclodextrin in a skewer shape, and a capping group for preventing the optionally substituted cyclodextrin from leaving, the capping group being located at a terminal of the linear molecule clathrated in the optionally substituted cyclodextrin in a skewer shape, and the weight average molecular weight of the linear molecule clathrated in the optionally substituted cyclodextrin in a skewer shape is greater than or equal to 21000 and less than or equal to 500000. The present invention also provides a display window protective plate or an automotive material each including the resin.

Advantageous Effects of Invention

The present invention can provide a resin that is transparent and has excellent impact resistance; and a display window protective plate or an automotive material each including the resin.

BRIEF DESCRIPTION OF DRAWING

FIG. 1 is a schematic diagram illustrating the basic structure of polyrotaxane conceptually.

DESCRIPTION OF EMBODIMENTS

The term "(meth)acrylic acid" as used herein refers to methacrylic acid or acrylic acid, and the term "(meth)acryloyl group" as used herein refers to a methacryloyl group or an acryloyl group.

The term "ethylenically unsaturated" compound as used herein refers to a compound having a group represented by the formula: —CR=CH$_2$ (wherein R represents an optionally substituted hydrocarbyl group). For example, an ethylenically unsaturated carboxylic acid refers to a carboxylic acid having a group represented by the formula: —CR=CH$_2$ (wherein R represents a hydrocarbyl group).

The term "hydrocarbyl group" as used herein refers to a monovalent group having a structure in which one hydrogen atom is removed from a hydrocarbon, and the term "hydrocarbylene group" as used herein refers to a bivalent group having a structure in which two hydrogen atoms are removed from a hydrocarbon.

The resin according to the present invention is a resin that has both a structural unit derived from a monomer having a carbon-carbon double bond at a terminal thereof and a structural unit derived from a polyrotaxane compound.

From the viewpoint of the polymerizability with the polyrotaxane compound substituted with a methacryloyl group, specific examples of the monomer having a carbon-carbon double bond at a terminal thereof to be used in the present invention include a (meth)acrylic acid ester, an aromatic vinyl compound, a vinyl cyanide compound, an ethylenically unsaturated carboxylic acid hydroxyalkyl ester, an ethylenically unsaturated sulfonic acid ester, an ethylenically unsaturated carboxylic acid amide, an ethylenically unsaturated carboxylic acid, an ethylenically unsaturated sulfonic acid, an ethylenically unsaturated alcohol or an ester thereof, an ethylenically unsaturated ether compound, an ethylenically unsaturated amine compound, an ethylenically unsaturated silane compound, a vinyl halide, and an aliphatic conjugated diene type compound. The monomers each having a carbon-carbon double bond at a terminal thereof may be used singly, or greater than or equal to 2 of them may be used in combination.

Specific examples of the (meth)acrylic acid ester include an acrylic acid ester and a methacrylic acid ester, and these (meth)acrylic acid esters may be used singly, or greater than or equal to 2 of them may be used in combination.

The acrylic acid ester is preferably one that has at least one group selected from the group consisting of an alkyl group having greater than or equal to 1 and less than or equal to 12 carbon atoms, a cycloalkyl group having greater than or equal to 3 and less than or equal to 12 carbon atoms, and an aryl group having greater than or equal to 6 and less than or equal to 12 carbon atoms, and specific examples of the acrylic acid ester include methyl acrylate, ethyl acrylate, butyl acrylate, lauryl acrylate, benzyl acrylate and cyclohexyl acrylate. The acrylic acid esters may be used singly, or greater than or equal to 2 of them may be used in combination.

The methacrylic acid ester is preferably one that has at least one group selected from the group consisting of an alkyl group having greater than or equal to 1 and less than or equal to 12 carbon atoms, a cycloalkyl group having greater than or equal to 3 and less than or equal to 12 carbon atoms and an aryl group having greater than or equal to 6 and less than or equal to 12 carbon atoms, and specific examples of the methacrylic acid ester include methyl methacrylate, ethyl methacrylate, 2-ethylhexyl methacrylate, lauryl methacrylate, benzyl methacrylate and cyclohexyl methacrylate. The methacrylic acid esters may be used singly, or greater than or equal to 2 of them may be used in combination.

Specific examples of the aromatic vinyl compound include styrene, α-methylstyrene, o-methylstyrene, p-methylstyrene, o-ethylstyrene, p-ethylstyrene, α-chlorostyrene, p-chlorostyrene, p-methoxystyrene, p-aminostyrene, p-acetoxystyrene, sodium styrenesulfonate, α-vinylnaphthalene, sodium 1-vinylnaphthalene-4-sulfonate, 2-vinylfluorene, 2-vinylpyridine and 4-vinylpyridine. The aromatic vinyl compounds may be used singly, or greater than or equal to 2 of them may be used in combination.

Specific examples of the vinyl cyanide compound include acrylonitrile, α-chloroacrylonitrile, α-methoxyacrylonitrile, methacrylonitrile, α-chloromethacrylonitrile and α-methoxymethacrylonitrile, vinylidene cyanide. The vinyl cyanide compounds may be used singly, or greater than or equal to 2 of them may be used in combination.

Specific examples of the ethylenically unsaturated carboxylic acid hydroxyalkyl ester include hydroxyethyl acrylate, hydroxyethyl methacrylate, hydroxypropyl acrylate, hydroxypropyl methacrylate, hydroxybutyl acrylate and hydroxybutyl methacrylate. The ethylenically unsaturated carboxylic acid hydroxyalkyl esters may be used singly, or greater than or equal to 2 of them may be used in combination.

Specific examples of the ethylenically unsaturated sulfonic acid ester include an alkyl vinylsulfonate and an alkyl isoprenesulfonate. The ethylenically unsaturated sulfonic acid esters may be used singly, or greater than or equal to 2 of them may be used in combination.

Specific examples of the ethylenically unsaturated carboxylic acid amide include acrylamide, methacrylamide, N-butoxymethylacrylamide, N-butoxymethylmethacrylamide, N-butoxyethylacrylamide, N-butoxyethylmethacrylamide, N-methoxymethylacrylamide, N-methoxymethylmethacrylamide, N-n-propoxymethylacrylamide, N-n-propoxymethylmethacrylamide, N-methylacrylamide, N-methylmethacrylamide, N,N-dimethylacrylamide, N,N-dimethylmethacrylamide, N,N-diethylacrylamide and N,N-diethylmethacrylamide. The ethylenically unsaturated carboxylic acid amides may be used singly, or greater than or equal to 2 of them may be used in combination.

Specific examples of the ethylenically unsaturated carboxylic acid include acrylic acid, methacrylic acid, itaconic acid, fumaric acid, fumaric anhydride, maleic acid and maleic anhydride. The ethylenically unsaturated carboxylic acids may be used singly, or greater than or equal to 2 of them may be used in combination.

Specific examples of the ethylenically unsaturated sulfonic acid include vinylsulfonic acid and isoprenesulfonic acid. The ethylenically unsaturated sulfonic acids may be used singly, or greater than or equal to 2 of them may be used in combination.

Specific examples of the ethylenically unsaturated alcohol or an ester thereof include allyl alcohol, methallyl alcohol, vinyl acetate, vinyl propionate, vinyl butyrate, vinyl stearate, vinyl benzoate, allyl acetate, methallyl caproate, allyl laurate, allyl benzoate, a vinyl alkylsulfonate, an allyl alkylsulfonate, a vinyl arylsulfonate and esters thereof. The ethylenically unsaturated alcohols and esters thereof may be used singly, or greater than or equal to 2 of them may be used in combination.

Specific examples of the ethylenically unsaturated ether compound include methyl vinyl ether, ethyl vinyl ether, n-propyl vinyl ether, isopropyl vinyl ether, methyl allyl ether and ethyl allyl ether. The ethylenically unsaturated ether compounds may be used singly, or greater than or equal to 2 of them may be used in combination.

Specific examples of the ethylenically unsaturated amine compound include vinyldimethylamine, vinyldiethylamine, vinyldiphenylamine, allyldimethylamine and methallyldiethylamine. The ethylenically unsaturated amine compounds may be used singly, or greater than or equal to 2 of them may be used in combination.

Specific examples of the ethylenically unsaturated silane compound include vinyltriethylsilane, methylvinyldichlorosilane, dimethylallylchlorosilane and vinyltrichlorosilane. The ethylenically unsaturated silane compounds may be used singly, or greater than or equal to 2 of them may be used in combination.

Specific examples of the vinyl halide include vinyl chloride, vinylidene chloride, 1,2-dichloroethylene, vinyl bromide, vinylidene bromide and 1,2-dibromoethylene. The vinyl halides may be used singly, or greater than or equal to 2 of them may be used in combination.

Specific examples of the aliphatic conjugated diene type compound include 1,3-butadiene, 2-methyl-1,3-butadiene, 2,3-dimethyl-1,3-butadiene, 2-neopentyl-1,3-butadiene, 2-chloro-1,3-butadiene, 1,2-dichloro-1,3-butadiene, 2,3-dichloro-1,3-butadiene, 2-bromo-1,3-butadiene, 2-cyano-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,4-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 3,4-dimethyl-1,3-hexadiene and 3,5-dimethyl-1,3-hexadiene. The aliphatic conjugated diene type compounds may be used singly, or greater than or equal to 2 of them may be used in combination.

The monomer having a carbon-carbon double bond at a terminal thereof is preferably a (meth)acrylic acid ester, from the viewpoint of transparency and excellent impact resistance.

The polyrotaxane compound to be used in the present invention is a compound in which, when the total number of hydrogen atoms in hydroxyl groups contained in polyrotaxane is defined as 100%, greater than or equal to 4% and less than or equal to 10% of the hydrogen atoms in the hydroxyl groups are substituted with a (meth)acryloyl group or a group containing a (meth)acryloyl group.

The polyrotaxane includes: optionally substituted cyclodextrin; a linear molecule that is clathrated in the optionally substituted cyclodextrin in a skewer shape; and a capping group for preventing the optionally substituted cyclodextrin from leaving, wherein the capping group is located at a terminal of the linear molecule clathrated in the optionally substituted cyclodextrin in a skewer shape, and the weight average molecular weight of the linear molecule clathrated in the optionally substituted cyclodextrin in a skewer shape is greater than or equal to 21000 and less than or equal to 500000.

FIG. 1 shows a schematic diagram illustrating the basic structure of the polyrotaxane conceptually. In FIG. 1, polyrotaxane 1 includes a linear molecule 3, a plurality of optionally substituted cyclodextrin molecules 2, and capping groups 4 respectively located at both terminals of linear molecule 3, wherein linear molecule 3 penetrates through opening parts of optionally substituted cyclodextrin molecules 2 so as to be clathrated in optionally substituted cyclodextrin molecules 2. In the present description, the state of optionally substituted cyclodextrin molecules 2 and linear molecule 3 illustrated in FIG. 1 is defined as "clathrated in a skewer shape".

The term "optionally substituted cyclodextrin" refers to cyclodextrin or substituted cyclodextrin. The polyrotaxane may contain both of cyclodextrin and substituted cyclodextrin. The polyrotaxane may be a crosslinked product of optionally substituted cyclodextrin molecules.

Specific examples of the cyclodextrin include α-cyclodextrin, β-cyclodextrin, γ-cyclodextrin, dimethylcyclodextrin, glycosylated cyclodextrin, and derivatives or modified products thereof. The polyrotaxane may contain a plurality of the cyclodextrin molecules, or may contain at least two types of cyclodextrin molecules.

The substituted cyclodextrin is a compound in which at least one of hydrogen atoms in hydroxyl groups contained in the cyclodextrin is substituted with a substituent group. The polyrotaxane may contain a plurality of the substituted cyclodextrin molecules, or may contain at least two types of the substituted cyclodextrin molecules.

A specific example of the substituent group is a group containing a hydroxyl group, such as a group represented by formula (I) shown below and a group containing a group represented by formula (I) shown below. The substituent group is preferably a group containing a group represented by formula (I) shown below, such as a group represented by formula (II) shown below, because of its good reactivity with the cyclodextrin. In formula (I), "*" represents a bonding site to another atom, and may be an ether bond as shown in formula (II) or may be a bonding site to an oxygen atom derived from a hydroxyl group contained in the cyclodextrin. In formula (II), "*" represents a bonding site to an oxygen atom derived from a hydroxyl group contained in the cyclodextrin.

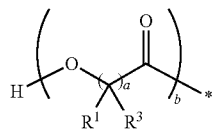

(I)

(wherein $R^1$ and $R^3$ independently represent a hydrogen atom or an optionally substituted hydrocarbyl group, a represents an integer of greater than or equal to 1, and b represents an integer of greater than or equal to 1, wherein, when a or b is greater than or equal to 2, multiple $R^1$'s may be the same as or different from each other, multiple $R^3$'s may be the same as or different from each other, and $R^1$ and $R^3$ may be the same as or different from each other).

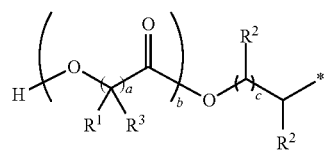

(II)

(wherein $R^1$, $R^2$ and $R^3$ independently represent a hydrogen atom or an optionally substituted hydrocarbyl group, a represents an integer of greater than or equal to 1, b represents an integer of greater than or equal to 1, and c represents an integer of greater than or equal to 1, wherein multiple $R^2$'s may be the same as or different from each other, multiple $R^1$'s may be the same as or different from each other and multiple $R^3$'s may be the same as or different from each other when a or b is greater than or equal to 2, and $R^1$, $R^2$ and $R^3$ may be the same as or different from one another).

The optionally substituted hydrocarbyl group in $R^1$, $R^2$ and $R^3$ may be one having any one of a linear form, a branched form and a cyclic form.

The optionally substituted hydrocarbyl group in $R^1$, $R^2$ and $R^3$ is a hydrocarbyl group or a substituted hydrocarbyl group.

Specific examples of the hydrocarbyl group in $R^1$, $R^2$ and $R^3$ include: an alkyl group such as a methyl group, an ethyl group, a n-propyl group, a cyclopropyl group, an isopropyl group, a n-butyl group, an isobutyl group, a sec-butyl group, a tert-butyl group and a cyclobutyl group; an aryl group such as a phenyl group, a 2-methylphenyl group, a 3-methylphenyl group, a 4-methylphenyl group, a 2,3-dimethylphenyl group, a 3,4-dimethylphenyl group, a 2,3,4-trimethylphenyl group, a 3,4,5-trimethylphenyl group, a 2,3,4,5-tetramethylphenyl group, an ethylphenyl group, an isopropylphenyl group, a tert-butylphenyl group, a naphthyl group and an anthracenyl group; and an aralkyl group such as a 1-methyl-1-phenylethyl group, a benzyl group, a (2-methylphenyl)methyl group, a (2,4-dimethylphenyl)methyl group, a (2,3,4,5-tetramethylphenyl)methyl group, a (2,3,4,6-tetramethylphenyl)methyl group, an (ethylphenyl)methyl group and a naphthylmethyl group.

A specific example of the substituted hydrocarbyl group in $R^1$, $R^2$ and $R^3$ includes a group having a structure in which at least one hydrogen atom in the above-mentioned hydrocarbyl group is substituted with a halogen atom (e.g., a chlorine atom, a bromine atom), a hydrocarbyl group, a hydrocarbyloxy group or the like.

Specific examples of the hydrocarbyl group include: an alkyl group such as a methyl group, an ethyl group, a n-propyl group, a cyclopropyl group, an isopropyl group, a n-butyl group, an isobutyl group, a sec-butyl group, a tert-butyl group and a cyclobutyl group; an aryl group such as a phenyl group, a 2-methylphenyl group, a 3-methylphenyl group, a 4-methylphenyl group, a 2,3-dimethylphenyl group, a 3,4-dimethylphenyl group, a 2,3,4-trimethylphenyl group, a 3,4,5-trimethylphenyl group, a 2,3,4,5-tetramethylphenyl group, an ethylphenyl group, an isopropylphenyl group, a tert-butylphenyl group, a naphthyl group and an anthracenyl group; and an aralkyl group such as a 1-methyl-1-phenylethyl group, a benzyl group, a (2-methylphenyl)methyl group, a (2,4-dimethylphenyl)methyl group, a (2,3,4,5-tetramethylphenyl)methyl group, a (2,3,4,6-tetramethylphenyl)methyl group, an (ethylphenyl)methyl group and a naphthylmethyl group.

Specific examples of the hydrocarbyloxy group include: an alkyloxy group such as a methoxy group, an ethoxy group, an isopropoxy group, a sec-butoxy group and a tert-butoxy group; an aryloxy group such as a phenoxy group, a 2-methylphenoxy group, a 2,5-dimethylphenoxy group, a 2,3,6-trimethylphenoxy group, an ethylphenoxy group and a naphthoxy group; and an aralkyloxy group such as a benzyloxy group, a (2-methylphenyl)methoxy group, a (2,6-dimethylphenyl)methoxy group, a (2,4,5-trimethylphenyl)methoxy group, and (ethylphenyl)methoxy group and a naphthylmethoxy group.

a is an integer of greater than or equal to 1, preferably greater than or equal to 1 and less than or equal to 9, more preferably greater than or equal to 2 and less than or equal to 8, still more preferably greater than or equal to 3 and less than or equal to 6.

b is an integer of greater than or equal to 1, preferably greater than or equal to 1 and less than or equal to 12, more preferably greater than or equal to 3 and less than or equal to 10, still more preferably greater than or equal to 5 and less than or equal to 9.

c is an integer of greater than or equal to 1, preferably greater than or equal to 1 and less than or equal to 4, more preferably greater than or equal to 1 and less than or equal to 3, still more preferably 1 or 2.

The substituted cyclodextrin may be substituted with a group other than the above-mentioned substituent group, such as an acyl group, a hydrocarbyl group, a hydroxyalkyl group, an alkylcarbamoyl group, an alkoxysilyl group and derivatives thereof.

The linear molecule may be any one, as long as the linear molecule can be clathrated in the opening parts of the optionally substituted cyclodextrin molecules in a skewer shape. Specific examples of the linear molecule include: polyvinyl alcohol, polyvinylpyrrolidone, poly(meth)acrylic acid, a cellulose-based resin (e.g., carboxymethyl cellulose, hydroxyethyl cellulose, hydroxypropyl cellulose), polyacrylamide, polyethylene oxide, polyethylene glycol, polypropylene glycol, a polyvinyl acetal-based resin, polyvinyl methyl ether, polyamine, polyethylene imine, casein, gelatin and starch and/or copolymers thereof, a polyolefin-based resin such as polyethylene, polypropylene and a copolymer with another olefin-based monomer, a polyester resin, a polyvinyl chloride resin, a polystyrene-based resin such as polystyrene and an acrylonitrile-styrene copolymer, a (meth)acrylic resin such as polymethyl methacrylate, a (meth)acrylic acid ester copolymer and an acrylonitrile-methyl acrylate copolymer, a polycarbonate resin, a polyurethane resin, a vinyl chloride-vinyl acetate copolymer and a polyvinyl butyral resin, and derivatives or modified products thereof; and polyisobutylene, polytetrahydrofuran, polyaniline, an acrylonitrile-butadiene-styrene copolymer (an ABS resin), a polyamide such as nylon, a polyimide, a polydiene such as polyisoprene and polybutadiene, a polysiloxane such as polydimethylsiloxane, a polysulfone, a polyimine, a poly (acetic anhydrate), a polyurea, a polysulfide, a polyphosphazene, a polyketone, a polyphenylene and a polyhaloolefin, and derivatives thereof. The linear molecule is preferably polypropylene glycol, polytetrahydrofuran, polydimethylsiloxane, polyethylene or polypropylene, more preferably polyethylene glycol.

The weight average molecular weight of the linear molecule is greater than or equal to 21000 and less than or equal to 500000, preferably greater than or equal to 25000 and less than or equal to 100000.

The use of a polyrotaxane compound in which a linear molecule has a weight average molecular weight falling within the above-mentioned range can result in a resin having excellent impact resistance.

The weight average molecular weight can be measured by producing a calibration curve from an elution time and a molecular weight by gel permeation chromatography (GPC) using a linear molecule having a known molecular weight as a standard reagent. The linear molecule is used in the form dissolved in a solvent, and an RI detector is used as a detector.

The capping group is not particularly limited, as long as the capping group can be located at a terminal of the linear molecule and can prevent the optionally substituted cyclodextrin from leaving. Specific examples of the capping group include a dinitrophenyl group (e.g., a 2,4-dinitrophenyl group, a 3,5-dinitrophenyl group), a dialkylphenyl group, a cyclodextrin group, an adamantane group, a trityl group, a fluorescein group, a pyrene group, a substituted benzene group (e.g., an alkylbenzene group, an alkyloxybenzene group, a phenol group, a halobenzene group, a cyanobenzene group, a benzoic acid group, an aminobenzene group), an optionally substituted multinuclear aromatic compound group, a steroid group, and derivatives or modified products thereof. The capping group is preferably a dinitrophenyl group, a cyclodextrin group, an adamantane group, a trityl group, a fluorescein group or a pyrene group, more preferably an adamantane group.

When the linear molecule is clathrated in the optionally substituted cyclodextrin in a skewer shape, it is preferred that the optionally substituted cyclodextrin is skewered by the linear molecule in an amount of greater than or equal to 0.001 and less than or equal to 0.6, preferably greater than or equal to 0.01 and less than or equal to 0.5, more preferably greater than or equal to 0.05 and less than or equal to 0.4, wherein the maximum amount of the optionally substituted cyclodextrin skewered by the linear molecule is defined as 1.

The method for producing the polyrotaxane is disclosed in, for example, Japanese Patent No. 3475252, International Patent Publication No. 2009/136618 and others. More specifically, the method for producing a type of the polyrotaxane which has substituted cyclodextrin is a method in which the production is carried out under the reaction conditions disclosed in International Patent Publication No. 2009/136618 using a lactone represented by formula (III) shown below. In this method, an oxacycloalkane represented by formula (IV) shown below may be used as required. In the case where a lactone represented by formula (III) and an oxacycloalkane represented by formula (IV) are used, it is preferred that polyrotaxane having cyclodextrin is reacted with an oxacycloalkane represented by formula (IV) and a product of the reaction is then reacted with a lactone represented by formula (III) to produce polyrotaxane having substituted cyclodextrin.

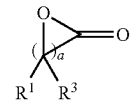

(III)

(wherein $R^1$, $R^3$ and a respectively have the same meanings as those for $R^1$, $R^3$ and a in formulae (I) and (II)).

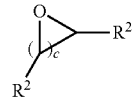

(IV)

(wherein $R^2$ and c respectively have the same meanings as those for $R^2$ and c in formulae (I) and (II)).

Specific examples of the group containing a (meth)acryloyl group include a group represented by formula (V) shown below, a group represented by formula (VI) shown below, a group represented by formula (VII) shown below and a group represented by formula (VIII) shown below. In formulae (V), (VI), (VII) and (VIII) shown below, "*"

represents a bonding site to an oxygen atom derived from a hydroxyl group contained in the polyrotaxane.

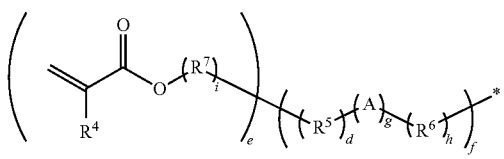

(V)

(wherein $R^5$, $R^6$ and $R^7$ independently represent a hydrogen atom or an optionally substituted hydrocarbylene group, $R^4$ represents a hydrogen atom or a methyl group, and A represents an oxygen atom, —NH—, —NR'— (wherein R' represents an optionally substituted hydrocarbylene group, of which the specific examples are those mentioned for the optionally substituted hydrocarbylene group in $R^5$, $R^6$ and $R^7$), —CO—, —COO—, —NHCO— or —NHCS—, d represents an integer of greater than or equal to 1, e represents an integer of greater than or equal to 1 and less than or equal to 3, f represents an integer of greater than or equal to 1, g represents an integer of greater than or equal to 0, h represents an integer of greater than or equal to 0, and i represents an integer of greater than or equal to 0, wherein multiple $R^5$'s may be the same as or different from each other when d is greater than or equal to 2 or f is greater than or equal to 2, multiple $R^6$'s may be the same as or different from each other when h is greater than or equal to 2 or f is greater than or equal to 2, multiple $R^4$'s may be the same as or different from each other when e is greater than or equal to 2, multiple $R^7$'s may be the same as or different from each other when i is greater than or equal to 2 or e is greater than or equal to 2, multiple A's may be the same as or different from each other when g is greater than or equal to 2 or f is greater than or equal to 2, and $R^5$, $R^6$ and $R^7$ may be the same as or different from one another).

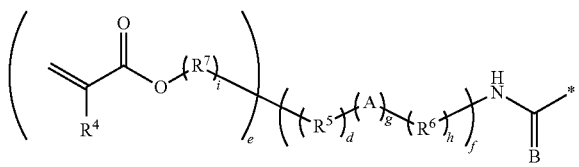

(VI)

(wherein $R^4$, $R^5$, $R^6$, $R^7$, A, d, e, f, g, h and i respectively have the same meanings as those for $R^4$, $R^5$, $R^6$, $R^7$, A, d, e, f, g, h and i in formula (V), and B represents an oxygen atom or a sulfur atom).

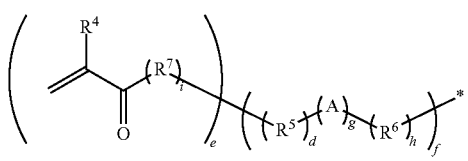

(VII)

(wherein $R^4$, $R^5$, $R^6$, $R^7$, A, d, e, f, g, h and i respectively have the same meanings as those for $R^4$, $R^5$, $R^6$, $R^7$, A, d, e, f, g, h and i in formula (V)).

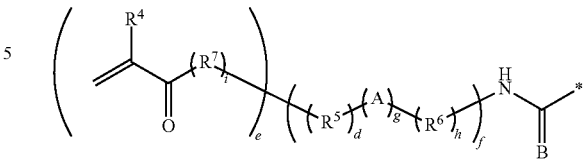

(VIII)

(wherein $R^4$, $R^5$, $R^6$, $R^7$, A, d, e, f, g, h and i respectively have the same meanings as those for $R^4$, $R^5$, $R^6$, $R^7$, A, d, e, f, g, h and i in formula (V), and B represents an oxygen atom or a sulfur atom).

The optionally substituted hydrocarbylene group in $R^5$, $R^6$ and $R^7$ may be in any one of a linear form, a branched form and a cyclic form.

The optionally substituted hydrocarbylene group in $R^5$, $R^6$ and $R^7$ is a hydrocarbylene group or a substituted hydrocarbylene group.

Specific examples of the hydrocarbylene group in $R^5$, $R^6$ and $R^7$ include: an alkylene group such as a methylene group, an ethylene group, a n-propylene group, a cyclopropylene group, an isopropylene group, a n-butylene group, an isobutylene group, a sec-butylene group, a tert-butylene group and a cyclobutylene group; an arylene group such as a phenylene group, a 2-methylphenylene group, a 3-methylphenylene group, a 4-methylphenylene group, a 2,3-dimethylphenylene group, a 3,4-dimethylphenylene group, a 2,3,4-trimethylphenylene group, a 3,4,5-trimethylphenylene group, a 2,3,4,5-tetramethylphenylene group, an ethylphenylene group, an isopropylphenylene group, a tert-butylphenylene group, a naphthylene group and an anthracenylene group; and an aralkylene group such as a 1-methyl-1-phenylethylene group, a benzylene group, a (2-methylphenyl)methylene group, a (2,4-dimethylphenyl)methylene group, a (2,3,4,5-tetramethylphenyl)methylene group, a (2,3,4,6-tetramethylphenyl)methylene group, an (ethylphenyl)methylene group and a naphthylmethylene group.

The substituted hydrocarbylene group in $R^5$, $R^6$ and $R^7$ includes groups each having a structure in which at least one of hydrogen atoms contained in the above-mentioned hydrocarbylene group is substituted with a halogen atom (e.g., a chlorine atom, a bromine atom), a hydrocarbyl group, a hydrocarbyloxy group or the like.

Specific examples of the hydrocarbyl group include: an alkyl group such as a methyl group, an ethyl group, a n-propyl group, a cyclopropyl group, an isopropyl group, a n-butyl group, an isobutyl group, a sec-butyl group, a tert-butyl group and a cyclobutyl group; an aryl group such as a phenyl group, a 2-methylphenyl group, a 3-methylphenyl group, a 4-methylphenyl group, a 2,3-dimethylphenyl group, a 3,4-dimethylphenyl group, a 2,3,4-trimethylphenyl group, a 3,4,5-trimethylphenyl group, a 2,3,4,5-tetramethylphenyl group, an ethylphenyl group, an isopropylphenyl group, a tert-butylphenyl group, a naphthyl group and an anthracenyl group; and an aralkyl group such as a 1-methyl-1-phenylethyl group, a benzyl group, a (2-methylphenyl) methyl group, a (2,4-dimethylphenyl)methyl group, a (2,3,4,5-tetramethylphenyl)methyl group, a (2,3,4,6-tetramethylphenyl)methyl group, an (ethylphenyl)methyl group and a naphthyl methyl group.

Specific examples of the hydrocarbyloxy group include: an alkyloxy group such as a methoxy group, an ethoxy group, an isopropoxy group, a sec-butoxy group and a tert-butoxy group; an aryloxy group such as a phenoxy group, a 2-methylphenoxy group, a 2,5-dimethylphenoxy group, a 2,3,6-trimethylphenoxy group, an ethylphenoxy group and a naphthoxy group; and an aralkyloxy group such as a benzyloxy group, a (2-methylphenyl)methoxy group, a (2,6-dimethylphenyl)methoxy group, a (2,4,5-trimethylphenyl)methoxy group, and (ethylphenyl)methoxy group and a naphthylmethoxy group.

The optionally substituted hydrocarbylene group in $R^5$, $R^6$ and $R^7$ is preferably a hydrocarbylene group, more preferably an alkylene group.

d is an integer of greater than or equal to 1, preferably greater than or equal to 1 and less than or equal to 8, more preferably greater than or equal to 1 and less than or equal to 4, still more preferably 1 or 2.

f is an integer of greater than or equal to 1, preferably greater than or equal to 1 and less than or equal to 4, more preferably greater than or equal to 1 and less than or equal to 3, still more preferably 1 or 2.

g is an integer of greater than or equal to 0, preferably greater than or equal to 0 and less than or equal to 4, more preferably greater than or equal to 0 and less than or equal to 2, still more preferably 0 or 1.

h is an integer of greater than or equal to 0, preferably greater than or equal to 0 and less than or equal to 8, more preferably greater than or equal to 0 and less than or equal to 4, still more preferably 0 or 2.

i is an integer of greater than or equal to 0, preferably greater than or equal to 0 and less than or equal to 8, more preferably greater than or equal to 0 and less than or equal to 4, still more preferably greater than or equal to 0 and less than or equal to 2.

A is preferably —NHCO—, and B is preferably an oxygen atom.

The (meth)acryloyl group or the group containing a (meth)acryloyl group is preferably a group containing a (meth)acryloyl group, more preferably a group represented by formula (VI) shown above.

In the polyrotaxane compound, when the total number of hydrogen atoms in hydroxyl groups contained in polyrotaxane is defined as 100%, greater than or equal to 4% and less than or equal to 10% of the hydrogen atoms in the hydroxyl groups are substituted with a (meth)acryloyl group or a group containing a (meth)acryloyl group, wherein the percentage of the substitution of the hydrogen atoms in the hydroxyl groups in the polyrotaxane by a (meth)acryloyl group or a group containing a (meth)acryloyl group is preferably greater than or equal to 4% and less than or equal to 7%. The number of hydrogen atoms in the hydroxyl groups contained in the polyrotaxane (i.e., a hydroxyl value) can be determined in accordance with JIS K 0070.

The use of a polyrotaxane compound in which the percentage of the substitution of the hydrogen atoms in the hydroxyl groups contained in the polyrotaxane by a (meth)acryloyl group or a group containing a (meth)acryloyl group falls within the above-mentioned range can result in a resin that is transparent and has excellent impact resistance.

Examples of the method for producing the polyrotaxane compound include:

(i) a method in which the polyrotaxane is reacted with a chloride containing a (meth)acryloyl group in the presence of a basic compound;

(ii) a method in which the polyrotaxane is reacted with an isocyanate compound containing a (meth)acryloyl group or an isothiocyanate compound containing a (meth)acryloyl group in the presence of a catalyst; and (iii) a method in which the polyrotaxane is reacted with a compound having greater than or equal to 2 isocyanate groups or a compound having greater than or equal to 2 isothiocyanate groups in the presence of a catalyst and subsequently the resultant product of the reaction is reacted with a hydroxyalkyl (meth)acrylate, and the method (ii) is preferred.

The number of (meth)acryloyl groups or groups containing a (meth)acryloyl group to be contained in the polyrotaxane compound can be controlled by varying the amount of a (meth)acryloyl-group-containing raw material to be added.

Specific examples of the basic compound to be used in the method (i) include triethylamine, pyridine and N,N-dimethyl-4-aminopyridine. Specific examples of the catalyst to be used in the methods (ii) and (iii) include dibutyltin dilaurate, tin octylate, bismuth octylate, zinc octylate, lead octylate, bismuth decanoate, triethylamine, triethylenediamine and N,N,N',N'-tetramethylethylenediamine.

Specific examples of the chloride containing a (meth)acryloyl group include acryloyl chloride, 2-chloroethyl acrylate and methacryloyl chloride. The chlorides may be used singly, or greater than or equal to 2 of them may be used in combination.

Specific examples of the isocyanate compound containing a (meth)acryloyl group include 2-methacryloyloxyethyl isocyanate, 3-methacryloyloxy-n-propyl isocyanate, 2-methacryloyloxyisopropyl isocyanate, 4-methacryloyloxy-n-butyl isocyanate, 2-methacryloyloxy-tert-butyl isocyanate, 2-methacryloyloxybutyl-4-isocyanate, 2-methacryloyloxybutyl-3-isocyanate, 2-methacryloyloxybutyl-2-isocyanate, 2-methacryloyloxybutyl-1-isocyanate, 5-methacryloyloxy-n-pentyl isocyanate, 6-methacryloyloxy-n-hexyl isocyanate, 7-methacryloyloxy-n-heptyl isocyanate, 2-(isocyanatoethyloxy)ethyl methacrylate, 3-methacryloyloxyphenyl isocyanate, 4-methacryloyloxyphenyl isocyanate, 2-acryloyloxyethyl isocyanate, 3-acryloyloxy-n-propyl isocyanate, 2-acryloyloxyisopropyl isocyanate, 4-acryloyloxy-n-butyl isocyanate, 2-acryloyloxy-tert-butyl isocyanate, 2-acryloyloxybutyl-4-isocyanate, 2-acryloyloxybutyl-3-isocyanate, 2-acryloyloxybutyl-2-isocyanate, 2-acryloyloxybutyl-1-isocyanate, 5-acryloyloxy-n-pentyl isocyanate, 6-acryloyloxy-n-hexyl isocyanate, 7-acryloyloxy-n-heptyl isocyanate, 2-(isocyanatoethyloxy)ethyl acrylate, 3-acryloyloxyphenyl isocyanate, 4-acryloyloxyphenyl isocyanate, 1,1-bis(methacryloyloxymethyl)methyl isocyanate, 1,1-bis(methacryloyloxymethyl)ethyl isocyanate, 1,1-bis(acryloyloxymethyl) methyl isocyanate, 1,1-bis(acryloyloxymethyl)ethyl isocyanate, 2'-pentenoyl-4-oxyphenyl isocyanate, and compounds each having such a structure that a hydrogen atom contained in each of the above-mentioned compounds is substituted by a halogen atom. These isocyanate compounds may be used singly, or greater than or equal to 2 of them may be used in combination.

Specific examples of the isothiocyanate compound containing a (meth)acryloyl group include 2-methacryloyloxyethyl isothiocyanate, 3-methacryloyloxy-n-propyl isothiocyanate, 2-methacryloyloxyisopropyl isothiocyanate, 4-methacryloyloxy-n-butyl isothiocyanate, 2-methacryloyloxy-tert-butyl isothiocyanate, 2-methacryloyloxybutyl-4-isothiocyanate, 2-methacryloyloxybutyl-3-isothiocyanate, 2-methacryloyloxybutyl-2-isothiocyanate, 2-methacryloyloxybutyl-1-isothiocyanate, 5-methacryloyloxy-n-pentyl isothiocyanate, 6-methacryloyloxy-n-hexyl isothiocyanate, 7-methacryloyloxy-n-heptyl isothiocyanate, 2-(isocyanatoethyloxy)ethyl methacrylate, 3-methacryloyloxyphenyl isothiocyanate, 4-methacryloyloxyphenyl isothiocyanate, 2-acryloyloxyethyl isothiocyanate, 3-acryloyloxy-n-propyl isothiocyanate, 2-acryloyloxyisopropyl isothiocyanate, 4-acryloyloxy-n-butyl isothiocyanate, 2-acryloyloxy-tert-butyl isothiocyanate, 2-acryloyloxybutyl-4-isothiocyanate, 2-acryloyloxybutyl-3-isothiocyanate, 2-acryloyloxybutyl-2-isothiocyanate, 2-acryloyloxybutyl-1-isothiocyanate, 5-acryloyloxy-n-pentyl isothiocyanate, 6-acryloyloxy-n-hexyl isothiocyanate, 7-acryloyloxy-n-heptyl isothiocyanate, 2-(isocyanatoethyloxy)ethyl acrylate, 3-acryloyloxyphenyl isothiocyanate, 4-acryloyloxyphenyl isothiocyanate, 1,1-bis(methacryloyloxymethyl)methyl isothiocyanate, 1,1-bis(methacryloyloxymethyl)ethyl isothiocyanate, 1,1-bis(acryloyloxymethyl)methyl isothiocyanate, 1,1-bis(acryloyloxymethyl)ethyl isothiocyanate, 2'-pentenoyl-4-oxyphenyl isothiocyanate, and compounds each having such a structure that a hydrogen atom contained in each of the above-mentioned compounds is substituted by a halogen atom. These isothiocyanate compounds may be used singly, or greater than or equal to 2 of them may be used in combination.

Specific examples of the compound having greater than or equal to 2 isocyanate groups include an aliphatic isocyanate, an alicyclic isocyanate, an aromatic aliphatic isocyanate and an aromatic isocyanate. These compounds may be used singly, or greater than or equal to 2 of them may be used in combination.

Specific examples of the aliphatic isocyanate include: an aliphatic diisocyanate such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimeryl diisocyanate and methyl 2,6-diisocyanatohexanoate (trivial name: lysine diisocyanate); and an aliphatic triisocyanate such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane. The aliphatic isocyanates may be used singly, or greater than or equal to 2 of them may be used in combination.

Specific examples of the alicyclic isocyanate include: an alicyclic diisocyanate such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (trivial name: isophorone diisocyanate), 4-methyl-1,3-cyclohexylene diisocyanate (trivial name: hydrogenated TDI), 2-methyl-1,3-cyclohexylene diisocyanate, 1,3- or 1,4-bis(isocyanatomethyl)cyclohexane (trivial name: hydrogenated xylylene diisocyanate) or a mixture thereof, methylenebis(4,1-cyclohexanediyl) diisocyanate (trivial name: hydrogenated MDI) and norbornane diisocyanate; and an alicyclic triisocyanate such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane. The alicyclic isocyanates may be used singly, or greater than or equal to 2 of them may be used in combination.

Specific examples of the aromatic aliphatic isocyanate include: an aromatic aliphatic diisocyanate such as methylenebis(4,1-phenylene) diisocyanate (trivial name: MDI), 1,3- or 1,4-xylylene diisocyanate or a mixture thereof, ω,ω'-diisocyanato-1,4-diethylbenzene, and 1,3- or 1,4-bis(1-isocyanato-1-methylethyl)benzene (trivial name: tetramethylxylylene diisocyanate) or a mixture thereof; and an aromatic aliphatic triisocyanate such as 1,3,5-triisocyanatomethylbenzene. The aromatic aliphatic isocyanates may be used singly, or greater than or equal to 2 of them may be used in combination.

Specific examples of the aromatic isocyanate include: an aromatic diisocyanate such as m-phenylene diisocyanate, p-phenylene diisocyanate, 4,4'-diphenyl diisocyanate, 1,5-naphthalene diisocyanate, 2,4-tolylene diisocyanate (trivial name: 2,4-TDI) or 2,6-tolylene diisocyanate (trivial name: 2,6-TDI) or a mixture thereof, 4,4'-toluidine diisocyanate and 4,4'-diphenyl ether diisocyanate; an aromatic triisocyanate such as triphenylmethane-4,4',4''-triisocyanate, 1,3,5-triisocyanatobenzene and 2,4,6-triisocyanatotoluene; and an aromatic tetraisocyanate such as 4,4'-diphenylmethane-2,2',5,5'-tetraisocyanate. The aromatic isocyanates may be used singly, or greater than or equal to 2 of them may be used in combination.

Specific examples of the compound having greater than or equal to 2 isothiocyanate groups include monomethylene diisothiocyanate, dimethylene diisothiocyanate, trimethylene diisothiocyanate, tetramethylene diisothiocyanate, pentamethylene diisothiocyanate, hexamethylene diisothiocyanate, toluene diisothiocyanate, xylene diisothiocyanate, tolylene diisothiocyanate and 1,3-bis(isothiocyanatomethyl)cyclohexane. These compounds may be used singly, or greater than or equal to 2 of them may be used in combination. The compound having greater than or equal to 2 isothiocyanate groups may be used in combination with the above-mentioned compound having greater than or equal to 2 isocyanate groups.

Specific examples of the hydroxyalkyl (meth)acrylate include hydroxymethyl methacrylate, hydroxyethyl methacrylate and hydroxymethyl acrylate. The hydroxyalkyl (meth)acrylates may be used singly, or greater than or equal to 2 of them may be used in combination.

An example of the method for producing the resin according to the present invention is a method in which the monomer having a carbon-carbon double bond at a terminal thereof and the monomer derived from a polyrotaxane compound are polymerized by, for example, an emulsion polymerization technique, a suspension polymerization technique, a bulk polymerization technique or a liquid injection polymerization technique (a cast polymerization technique).

By employing the above-mentioned method, the reaction of a carbon-carbon double bond derived from a (meth)acryloyl group contained in the polyrotaxane compound with a carbon-carbon double bond derived from the monomer having a carbon-carbon double bond at a terminal thereof occurs to produce the resin according to the present invention.

The polymerization can be carried out by means of irradiation with light or using a polymerization initiator. Specific examples of the polymerization initiator include an azo-type initiator (e.g., 2,2'-azobisisobutyronitrile, 2,2'-azobis(2,4-dimethylvaleronitrile)), a peroxide-type initiator (e.g., lauroyl peroxide, benzoyl peroxide), and a redox-type initiator that is a combination of an organic peroxide with an amine.

In the case where the polymerization initiator is added during the polymerization, the amount of the polymerization initiator to be added is preferably greater than or equal to 0.01 parts by mass and less than or equal to 1 part by mass, more preferably greater than or equal to 0.01 parts by mass and less than or equal to 0.5 parts by mass, relative to the total amount (i.e., 100 parts by mass) of the monomer having a carbon-carbon double bond at a terminal thereof and the polyrotaxane compound to be added during the polymerization.

In the resin according to the present invention, the content of the structural unit derived from the polyrotaxane compound is preferably greater than or equal to 10 parts by mass, more preferably greater than or equal to 10 parts by mass and less than or equal to 50 parts by mass, relative to the total amount (i.e., 100 parts by mass) of the structural unit derived from the monomer having a carbon-carbon double bond at a terminal thereof and the structural unit derived from the polyrotaxane compound.

In the resin according to the present invention, the content of the structural unit derived from the monomer having a carbon-carbon double bond at a terminal thereof is preferably less than or equal to 90 parts by mass, more preferably greater than or equal to 50 parts by mass and less than or equal to 90 parts by mass, relative to the total amount (i.e., 100 parts by mass) of the structural unit derived from the monomer having a carbon-carbon double bond at a terminal thereof and the structural unit derived from the polyrotaxane compound.

In the resin according to the present invention, when the content of the structural unit derived from the monomer having a carbon-carbon double bond at a terminal thereof and the content of the structural unit derived from the polyrotaxane compound are adjusted to the above-mentioned ranges, it becomes possible to produce a resin that is transparent and has excellent impact resistance.

In the resin according to the present invention, any known additives may be contained, as long as the effects of the present invention cannot be impaired. Examples of the additive include: an ultraviolet ray absorber for improving weather resistance (e.g., a hindered amine-type compound); an antioxidant agent for preventing discoloration or yellowing (yellow discoloration) (e.g., a phenol-type compound, a phosphorus compound); a chain transfer agent for controlling a molecular weight (e.g., a linear or branched alkyl mercaptan compound, such as methyl mercaptan, n-butyl mercaptan and t-butyl mercaptan); a flame retardant agent for imparting flame retardancy; and a coloring agent.

The resin according to the present invention can be used as a display window protective plate or an automotive material. A display window protective plate is used in an electronic derive equipped with a window (a display) on which character information or image information is to be displayed, and can protect the window (display). Examples of the electronic device include a mobile phone, a smartphone, a personal computer, a digital camera, a video camera, a portable game machine and a portable audio player. Examples of the automotive material include a rear lamp cover and an automotive window such as, front window and a side window.

As the method for producing a display window protective plate or an automotive material using the resin according to the present invention, a method can be mentioned, in which the resin is molded by a technique such as injection molding, extrusion molding and vacuum molding to produce the display window protective plate or the automotive material. In the case where the resin produced by the above-mentioned polymerization technique has a plate-like shape, it is also possible to cut the resin into a desired size without employing the molding.

EXAMPLES

Hereinbelow, the present invention will be described concretely by way of Examples and Comparative Examples. However, the present invention is not intended to be limited by these examples. The impact resistance of a transparent resin composition was evaluated in terms of Charpy impact strength obtained by cutting the resin into an unnotched test specimen having a size of 10 mm×80 mm×4 mm and then applying a flatwise impact to the test specimen in accordance with JIS K 7111.

The transparency was evaluated by the observation with naked eyes.

<Hydroxyl Value>

The hydroxyl value (unit: mgKOH/g) of polyrotaxane was measured in accordance with JIS K 0070.

Example 1

SeRM (registered tradename) Super Polymer SH3400P (manufactured by Advanced Softmaterials Inc., hydroxyl value: 72 mgKOH/g) (340 g), which was polyrotaxane substituted with ε-caprolactone, contained polyethylene glycol (PEG) having a weight average molecular weight of 35000 as a linear molecule, and had a weight average molecular weight of 700000, was dissolved in dehydrated methyl methacrylate (1300 mL) at room temperature. Methacryloyloxyethyl isocyanate (3.4 mL) was added to the resultant solution, and then dibutyltin dilaurate was added thereto as a catalyst in an amount of 1 part by mass relative to the amount of methacryloyloxyethyl isocyanate. Subsequently, the resultant mixture was stirred at room temperature for 5 days to produce a polyrotaxane compound.

The polyrotaxane compound (10 parts by mass), methyl methacrylate (89.9 parts by mass) and 2,2'-azobisisobutyronitrile (0.1 parts by mass) were added and mixed together. Subsequently, the resultant mixture was poured into a cell that was composed of two glass plates and a gasket made from soft polyvinyl chloride and had a gap distance of 4 mm, and then the mixture was heated at 70° C. for 3 hours and then at 120° C. for 40 minutes in a polymerization vessel using air as a heat medium to cause the polymerization of the mixture, thereby producing a resin.

The impact resistance and transparency of the resin were evaluated. The results are shown in Table 1.

Example 2

The same procedure as in Example 1 was carried out, except that methacryloyloxyethyl isocyanate was added in an amount of 5.1 mL, thereby producing a resin. The impact resistance and transparency of the resin were evaluated. The results are shown in Table 1.

Comparative Example 1

The above-mentioned SeRM (registered tradename) Super Polymer SH3400P (10 parts by mass), methyl methacrylate (89.9 parts by mass) and 2,2'-azobisisobutyronitrile (0.1 parts by mass) were added and mixed together. Subsequently, the resultant mixture was poured into a cell that was composed of two glass plates and a gasket made from soft polyvinyl chloride and had a gap distance of 4 mm, and then the mixture was heated at 70° C. for 3 hours and then at 120° C. for 40 minutes in a polymerization vessel using air as a heat medium to cause the polymerization of the mixture, thereby producing a resin. The impact resistance and transparency of the resin were evaluated. The results are shown in Table 1.

Comparative Example 2

The same procedure as in Example 1 was carried out, except that methacryloyloxyethyl isocyanate was added in an amount of 1.7 mL, thereby producing a resin. The impact resistance and transparency of the resin were evaluated. The results are shown in Table 1.

Comparative Example 3

The same procedure as in Example 1 was carried out, except that methacryloyloxyethyl isocyanate was added in an amount of 6.8 mL, thereby producing a resin. The impact resistance and transparency of the resin were evaluated. The results are shown in Table 1.

Comparative Example 4

The same procedure as in Example 1 was carried out, except that methacryloyloxyethyl isocyanate was added in an amount of 8.8 mL, thereby producing a resin. The impact resistance and transparency of the resin were evaluated. The results are shown in Table 1.

Comparative Example 5

The same procedure as in Example 1 was carried out, except that methacryloyloxyethyl isocyanate was added in an amount of 26.5 mL, thereby producing a resin. The impact resistance and transparency of the resin were evaluated. The results are shown in Table 1.

Comparative Example 6

The same procedure as in Example 1 was carried out, except that SeRM (registered tradename) Super Polymer SH2400P (manufactured by Advanced Softmaterials Inc., hydroxyl value: 76 mgKOH/g) that contained polyethylene glycol (PEG) having a weight average molecular weight of 20000 as a linear molecule and had a weight average molecular weight of 400000 was used in place of the above-mentioned SeRM (registered tradename) Super Polymer SH3400P, thereby producing a resin. The impact resistance and transparency of the resin were evaluated. The results are shown in Table 1.

Comparative Example 7

The same procedure as in Example 1 was carried out, except that SeRM (registered tradename) Super Polymer SH1310P (manufactured by Advanced Softmaterials Inc., hydroxyl value: 85 mgKOH/g) that contained polyethylene glycol having a weight average molecular weight of 11000 as a linear molecule and had a weight average molecular weight of 180000 was used in place of the above-mentioned SeRM (registered tradename) Super Polymer SH3400P and methacryloyloxyethyl isocyanate was added in an amount of 4.0 mL, thereby producing a resin. The impact resistance and transparency of the resin were evaluated. The results are shown in Table 1.

Example 3

The same procedure as in Example 1 was carried out, except that the above-mentioned SeRM (registered tradename) Super Polymer SH3400P was added in an amount of 20 parts by mass and methyl methacrylate was added in an amount of 79.9 parts by mass, thereby producing a resin. The impact resistance and transparency of the resin were evaluated. The results are shown in Table 1.

Comparative Example 10

The same procedure as in Example 1 was carried out, except that the polyrotaxane compound was not added, thereby producing a resin made only from methyl methacrylate. The impact resistance and transparency of the resin were evaluated. The results are shown in Table 1.

TABLE 1

|  | Structural unit derived from polyrotaxane compound or polyrotaxane | Weight average molecular weight of PEG | Ratio (%) of substitution by (meth)acryloyl-containing group | Charpy impact value (kJ/m$^2$) | Transparency |
|---|---|---|---|---|---|
| Example 1) | 10 parts by mass | 35,000 | 5.6 | 54 | Transparent |
| Example 2) | 10 parts by mass | 35,000 | 8.3 | 31 | Transparent |
| Comparative Example 1) | 10 parts by mass | 35,000 | 0 | Not measured | Opaque |
| Comparative Example 2) | 10 parts by mass | 35,000 | 2.8 | 18 | Transparent |
| Comparative Example 3) | 10 parts by mass | 35,000 | 11.1 | 22 | Transparent |
| Comparative Example 4) | 10 parts by mass | 35,000 | 14.4 | 20 | Transparent |
| Comparative Example 5) | 10 parts by mass | 35,000 | 42.2 | 24 | Transparent |
| Comparative Example 6) | 10 parts by mass | 20,000 | 5.6 | 17 | Transparent |
| Comparative Example 7) | 10 parts by mass | 11,000 | 5.6 | 19 | Transparent |
| Example 3) | 20 parts by mass | 35,000 | 5.6 | 51 | Transparent |
| Comparative Example 10) | 0 part by mass | — | — | 16 | Transparent |

REFERENCE SIGNS LIST

1: Polyrotaxane
2: Optionally substituted cyclodextrin
3: Linear molecule
4: Capping group

The invention claimed is:

1. A resin comprising both a structural unit from a monomer having a carbon-carbon double bond at a terminal thereof and a structural unit from a polyrotaxane compound, the resin being a polymerized compound of the monomer having a carbon-carbon double bond at a terminal thereof and the polyrotaxane compound, wherein the structural unit from the monomer having a carbon-carbon double bond at a terminal thereof is a structural unit from methyl acrylate, ethyl acrylate, butyl acrylate, lauryl acrylate, benzyl acrylate, cyclohexyl acrylate, methyl methacrylate, ethyl methacrylate, 2-ethylhexyl methacrylate, lauryl methacrylate, benzyl methacrylate, cyclohexyl methacrylate, a vinyl cyanide compound, an ethylenically unsaturated carboxylic acid hydroxyalkyl ester, an ethylenically unsaturated sulfonic acid ester, acrylic acid, methacrylic acid, an ethylenically unsaturated amine compound, an ethylenically unsaturated silane compound, or a vinyl halide; and the polyrotaxane compound is a compound in which, when the total number of hydrogen atoms in hydroxyl groups contained in polyrotaxane is defined as 100%, greater than or equal to 4% and less than or equal to 10% of the hydrogen atoms in the hydroxyl groups are substituted with a (meth)acryloyl group or a group containing a (meth)acryloyl group, the polyrotaxane comprising:

optionally substituted cyclodextrin;

a linear molecule clathrated in the optionally substituted cyclodextrin in a skewer shape; and a capping group for preventing the optionally substituted cyclodextrin from leaving, the capping group being located at a terminal of the linear molecule clathrated in the optionally substituted cyclodextrin in a skewer shape, and the weight average molecular weight of the linear molecule clathrated in the optionally substituted cyclodextrin in a skewer shape is greater than or equal to 21000 and less than or equal to 500000.

2. The resin according to claim 1, wherein
the resin comprises the structural unit from the polyrotaxane compound in an amount of greater than or equal to 10 parts by mass, relative to 100 parts by mass of the total amount of the structural unit from the monomer having a carbon-carbon double bond at a terminal thereof and the structural unit from the polyrotaxane compound.

3. The resin according to claim 2, wherein
the resin comprises the structural unit from the polyrotaxane compound in an amount of greater than or equal to 10 parts by mass and less than or equal to 50 parts by mass, relative to 100 parts by mass of the total amount of the structural unit from the monomer having a carbon-carbon double bond at a terminal thereof and the structural unit from the polyrotaxane compound.

4. A display device comprising:
a display configured to display character information or image information; and
a protective plate covering the display, the protective plate comprising the resin as recited in claim 1.

5. An automotive window comprising the resin as recited in claim 1.

6. The resin according to claim 1, wherein the structural unit from the monomer having a carbon-carbon double bond at a terminal thereof is a structural unit from methyl acrylate, ethyl acrylate, butyl acrylate, lauryl acrylate, benzyl acrylate, cyclohexyl acrylate, methyl methacrylate, ethyl methacrylate, 2-ethylhexyl methacrylate, lauryl methacrylate, benzyl methacrylate or cyclohexyl methacrylate.

* * * * *